April 13, 1937.    W. C. WEAVER    2,077,293

LATHE CENTER

Filed April 22, 1936

William C. Weaver
INVENTOR

BY Victor J. Evans & Co.
ATTORNEY

Patented Apr. 13, 1937

2,077,293

UNITED STATES PATENT OFFICE 2,077,293

LATHE CENTER

William C. Weaver, Dalmatia, Pa.

Application April 22, 1936, Serial No. 75,810

2 Claims. (Cl. 82—33)

My invention relates to improvements in lathe centers, for wood turning lathes.

Important objects of my invention are to provide an efficient lathe center which is rotatable with the work to prevent marking and burning of the latter by friction, particularly adapted to withstand wear under prolonged use and which comprises few parts inexpensive to manufacture and readily assembled and disassembled and in which the center parts proper are packed in grease and anti-frictionally mounted against play either axially or radially.

Other and subordinate objects together with the precise nature of my improvements will be readily understood when the following description and claims are read in conjunction with the accompanying drawing.

Figure 1:
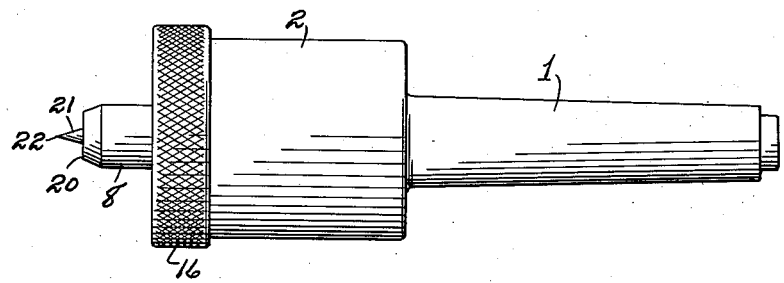
Figure 1 is a view in side elevation of my improved lathe center.
Figure 2:
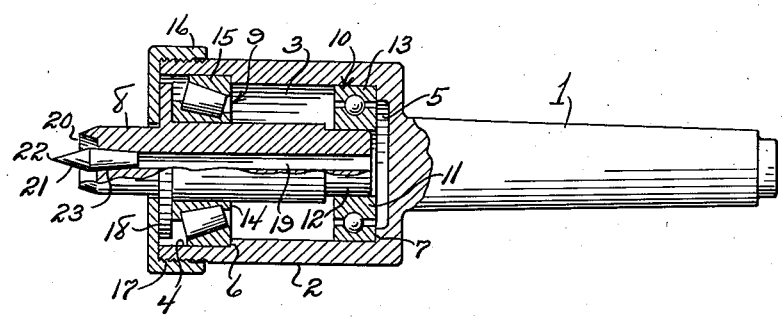
Figure 2 is a view partly in longitudinal section and partly in side elevation.

Referring to the drawing by numeral, my improved lathe comprises a tapered shank portion 1 designed to fit in the usual manner in the tailstock of the usual wood turning lathe and formed at its outer end with a concentric cylindrical housing 2. The housing 2 is counter-bored concentrically to provide a chamber 3 having a large annular seat 4 at its outer end, reduced portion 5 at its inner end, and front and rear radial shoulders 6 and 7 between the intermediate portion of the chamber 3 and said seat and reduced portion, respectively.

The center proper comprises a spindle 8 mounted in the chamber 3 in front and rear anti-friction bearings 9 and 10, respectively, and projecting outside the front end of said chamber. The rear anti-friction bearing is a radial thrust ball bearing the inner race member 11 of which is mounted upon a reduced rear end part 12 of the spindle 8 with the outer race member 13 bearing against the rear shoulder 7. The front anti-friction bearing 9 is in angular contact tapered roller bearing the inner race member 14 of which is fitted upon the spindle 8 intermediate its ends with the outer race member 15 fitting in the seat 4 and bearing against the front shoulder 6. The spindle 8 is held against the inner race member 14 of the front bearing 9 by an annular cap member 16 threaded onto the front end of the housing 2, as at 17, over the projecting end of said spindle and bearing against a wide radial flange 18 formed on the spindle 8 and bearing against the outer side of the inner race member 14.

The spindle 8 is provided with an axial through bore 19 outwardly flared at the front end of the spindle and an annular outwardly tapered front edge 20 for engaging one end of the work. A center pin 21 having a sharp point 22 is mounted in the outer end of the bore 19 by means of a tapered shank portion 23 on said pin fitted into the outwardly flared portion of said bore.

The chamber 3 is designed to be packed with grease and is sealed against the leakage of grease by the coengaging cap member 16 and flange 18. The reduced rear end 5 of the chamber 3 facilitates the passage of the grease through the rear bearing 10. The bore 19 in the spindle 8 provides for easily driving the center pin 21 out of the spindle 8 for replacement purposes. The relative arrangement of the front anti-friction bearing 9, spindle flange 18 and cap member 16 provide two opposed end thrust bearings one an anti-friction bearing and the other a frictional bearing functioning to seal the chamber against leakage of grease therefrom. The particular arrangement of the two end thrust bearings thus formed positively prevents the spindle from chattering and provides for holding the front end of the spindle in accurately centered position in the front bearing 9.

The foregoing is a detailed description of a preferred embodiment of my invention and it is thought that its operation and advantages will be clear therefrom.

It is to be understood, however, that the present disclosure is illustrative rather than restrictive and that right is herein reserved to modifications of details described falling within the scope of the claims appended hereto.

What I claim is:

1. A lathe center comprising, a shank formed with a cylindrical end housing having an interior circular shoulder adjacent its forward end, a tapered roller bearing fitted into the forward end of said housing and including outer and inner race members the former bearing against said shoulder, a spindle mounted in the inner race member and having a circular radial flange opposed to said shoulder and bearing against the outer side of the inner race member, said spindle projecting outside of said housing, and an annular cap member threaded onto said housing over the projecting end of the spindle and bearing against said flange.

2. A center for lathes comprising, a shank provided with a cylindrical end housing having a pair of interior circular integral non-resilient shoulders adjacent the front and rear ends thereof, respectively, a pair of anti-friction bearings in the front and rear ends of the housing, respectively, the outer race members of said front and rear bearings seating against said shoulders, respectively, an axially bored spindle having a reduced inner end mounted in the inner race member of the rear bearing and projecting at its outer end outside said housing, said spindle being mounted intermediate its ends in the inner race member of the front bearing and having a wide circular radial flange opposed to the front bearing, an annular cap member threaded on said housing over the projecting end of said spindle and continuously bearing against said flange while the parts are in assembled position, and a center pin fitted into the front end of the bore in said spindle.

WILLIAM C. WEAVER.